US010533307B2

(12) United States Patent
Gal et al.

(10) Patent No.: US 10,533,307 B2
(45) Date of Patent: Jan. 14, 2020

(54) FLUID GOVERNING SYSTEM

(71) Applicant: AQUA - RIMAT LTD., Hod Hasharon (IL)

(72) Inventors: Alon Haim Gal, Yehud (IL); Lior Hertz, Hod Hasharon (IL); Shay Ravid, Mitspe Harashim (IL)

(73) Assignee: WINT - WI LTD., Hod Hasharon (IL)

( * ) Notice: Subject to any disclaimer, the term of this patent is extended or adjusted under 35 U.S.C. 154(b) by 250 days.

(21) Appl. No.: 15/310,338

(22) PCT Filed: May 10, 2015

(86) PCT No.: PCT/IL2015/050484
§ 371 (c)(1),
(2) Date: Nov. 10, 2016

(87) PCT Pub. No.: WO2015/173800
PCT Pub. Date: Nov. 19, 2015

(65) Prior Publication Data
US 2017/0145667 A1    May 25, 2017

(30) Foreign Application Priority Data
May 11, 2014  (IL) .......................................... 232537

(51) Int. Cl.
*E03B 7/07*      (2006.01)
*E03B 7/00*      (2006.01)
(Continued)

(52) U.S. Cl.
CPC ................ *E03B 7/072* (2013.01); *E03B 7/00* (2013.01); *E03B 7/07* (2013.01); *E03B 7/095* (2013.01);
(Continued)

(58) Field of Classification Search
CPC ... E03B 7/072; E03B 7/00; E03B 7/07; E03B 7/095; F16L 55/00; G01F 15/005
See application file for complete search history.

(56) References Cited

U.S. PATENT DOCUMENTS

| 5,007,453 A | 4/1991 | Berkowitz et al. |
| 5,038,820 A | 8/1991 | Ames et al. |
(Continued)

FOREIGN PATENT DOCUMENTS

| AU | 781174 B2 | 5/2005 |
| CN | 101441809 A | 5/2009 |
(Continued)

OTHER PUBLICATIONS

"Electrical Output Versions", Arad Group, Dec. 2012.
(Continued)

*Primary Examiner* — Kevin L Lee
(74) *Attorney, Agent, or Firm* — Dorsey & Whitney LLP

(57) ABSTRACT

A fluid governing system including a fluid inlet and fluid inlet port coupleable to an upstream pipe segment; a fluid outlet and a fluid outlet port coupleable to a downstream pipe segment; a flow unit; a metering inlet path in flow communication with the fluid inlet; a metering outlet path in flow communication with the fluid outlet, the metering inlet path is in flow communication with the metering outlet path through the flow unit which is articulable between the metering inlet path and the metering outlet path; a pressure responsive sealing diaphragm for selective sealing a metering inlet port; an inlet chamber disposed at a face of the sealing diaphragm, the inlet chamber in flow communication with the fluid inlet; a control chamber disposed at an opposite face of the sealing diaphragm; and a control fluid duct extending between the inlet chamber and the control chamber.

12 Claims, 14 Drawing Sheets

(51) Int. Cl.
*E03B 7/09* (2006.01)
*F16L 55/00* (2006.01)
*G01F 15/00* (2006.01)
*G01F 15/18* (2006.01)

(52) U.S. Cl.
CPC ............ *F16L 55/00* (2013.01); *G01F 15/005* (2013.01); *G01F 15/185* (2013.01)

(56) References Cited

U.S. PATENT DOCUMENTS

| | | | |
|---|---|---|---|
| 5,207,386 | A | 5/1993 | Mehoudar |
| 5,213,303 | A | 5/1993 | Walker |
| 5,413,282 | A | 5/1995 | Boswell |
| 6,178,816 | B1 | 1/2001 | Katzman et al. |
| 6,237,618 | B1 | 5/2001 | Kushner |
| 6,386,029 | B1 | 5/2002 | Katzman et al. |
| 6,404,345 | B1 | 6/2002 | Frasier |
| 6,491,062 | B1 | 12/2002 | Croft |
| 6,532,979 | B1 | 3/2003 | Richter |
| 6,701,956 | B1 | 3/2004 | Berger |
| 2003/0192600 | A1 | 12/2003 | Ford |
| 2004/0222394 | A1 | 11/2004 | Hall |
| 2006/0009928 | A1 | 1/2006 | Addink et al. |
| 2006/0059977 | A1 | 3/2006 | Kates |
| 2007/0284293 | A1 | 12/2007 | Pitchford et al. |
| 2008/0149180 | A1* | 6/2008 | Parris et al. ............ E03B 7/072 137/1 |
| 2008/0295895 | A1 | 12/2008 | Vincent et al. |
| 2009/0235992 | A1 | 9/2009 | Armstrong |
| 2009/0271045 | A1 | 10/2009 | Savelle, Jr. et al. |
| 2009/0309755 | A1 | 12/2009 | Williamson et al. |
| 2010/0057382 | A1 | 3/2010 | Li |
| 2010/0289652 | A1 | 11/2010 | Javey et al. |
| 2011/0035063 | A1 | 2/2011 | Palayur |
| 2011/0050395 | A1 | 3/2011 | Ervin |
| 2011/0066297 | A1 | 3/2011 | Saberi et al. |
| 2011/0298635 | A1 | 12/2011 | Yip |
| 2012/0239211 | A1 | 9/2012 | Walker et al. |
| 2012/0305084 | A1 | 12/2012 | Ball |

FOREIGN PATENT DOCUMENTS

| | | |
|---|---|---|
| CN | 100580388 C | 1/2010 |
| CN | 201795827 U | 4/2011 |
| CN | 102269613 A | 12/2011 |
| CN | 103162760 A | 6/2013 |
| GB | 2403527 B | 1/2005 |
| KR | 20080005694 A | 1/2008 |
| WO | 2004025229 A1 | 3/2004 |
| WO | 2011044900 A1 | 4/2011 |

OTHER PUBLICATIONS

"Model FAM-UFR", Arad Group, Jun. 2013.
International Search Report issued in the corresponding application PCT/IL2015/050484 dated Aug. 24, 2015.

* cited by examiner

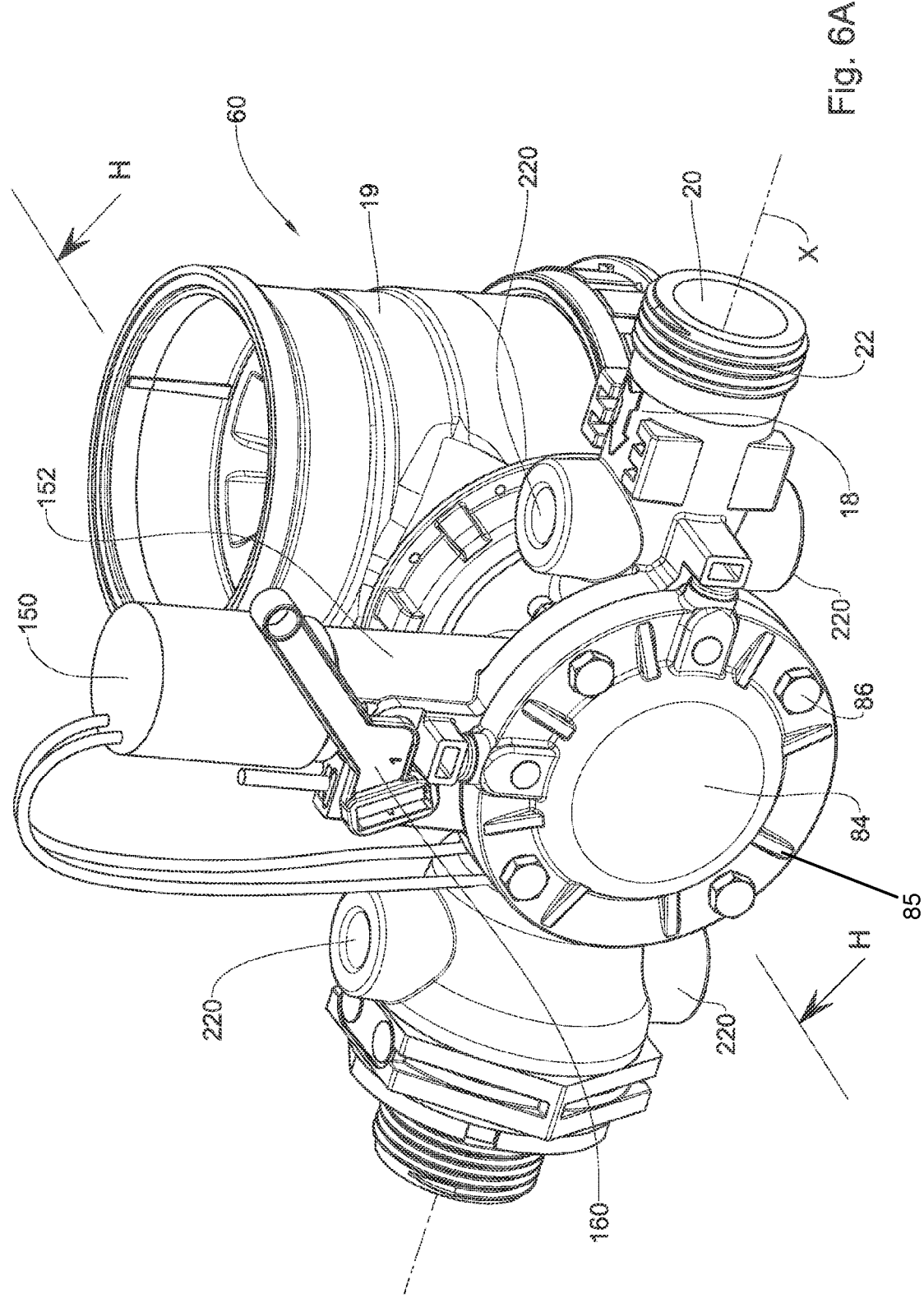

FLUID GOVERNING SYSTEM

CROSS-REFERENCE TO RELATED APPLICATIONS

The present application is a U.S. National Phase of PCT/IL2015/050484 on May 13, 2015 claiming priority to Israeli patent application No. 232537 filed May 11, 2014; the disclosure of the PCT Application is hereby incorporated by reference into the present Application.

TECHNOLOGICAL FIELD

The presently disclosed subject matter is generally in the field of fluid governing systems, and more particularly it is concerned with flow metering and control devices.

BACKGROUND AND PRIOR ART

References considered to be relevant as background to the presently disclosed subject matter are listed below.

U.S. Pat. No. 6,178,816 discloses a multiple pipeline orientation water meter that includes a water meter arrangement having a water meter and a pipe connector. The water meter body co-acts with the pipe connector to permit proper installation of the water meter in various piping orientations.

U.S. Pat. No 6,701,956 water control device including a housing, including as one unit, an inlet port and an exit port for flow therethrough of water, and a water meter mounting flange and a water flow control valve seat member in fluid communication with each other and with at least one of the inlet and outlet ports, and a water meter sealingly attached to the water meter mounting flange, and a water flow control valve sealingly attached to the water flow control valve seat member.

WO2004025229 discloses a flow responsive valve for a flow metering system comprising a fluid meter having a minimum measuring flow threshold. The valve is shiftable between an open position at flow rates above the minimum measuring flow threshold, and a pressure pulsating position depending on pressure differential over an inlet port and an outlet port of the valve The pressure pulsating position alters between a closed position essentially prohibiting fluid flow therethrough at flow rates below the minimum measuring flow threshold, and an open position admitting fluid flow into the supply line at a measurable flow rate above the minimum measuring flow threshold.

Acknowledgement of the above references herein is not to be inferred as meaning that these are in any way relevant to the patentability of the presently disclosed subject matter.

GENERAL DESCRIPTION

The present disclosure is directed to a flow control unit configured for governing, monitoring and metering fluid flow therethrough, at substantially high accuracy, i.e. monitoring fluid flow through the system also at substantially low flow rates and substantially regardless of pressure fluctuations.

By one particular configuration of the present disclosure, the flow control unit is articulated with one or more electronically operated flow control devices, such as an electric flow meter, electrically operated valves, solenoids, sensors, controllers, and the like. Any one or more of such electronically operated flow control devices can be configured for wired or wireless communications, whereby various communication arrangements can be configure, such as cellular communications, radio-communications, etc. for transmitting and receiving control and command signals.

The term fluid as used herein the specification and claims is used in its broad sense, namely liquids (e.g. domestic/municipal water supply, agricultural/industrial water supply, oils and the like), gases and mixtures thereof.

According to a first aspect of the present disclosed matter there is provided a fluid governing system.

According to a second aspect of the present disclosed matter there is provided a fluid flow system configured with a fluid governing and metering system.

According to yet an aspect of the present disclosed matter there is provided a fluid flow pressure regulator for use in a fluid governing and metering system.

According to a first of its aspects the disclosure calls for a fluid governing system comprising a fluid inlet with a port coupleable to an upstream pipe segment, a fluid outlet with a port coupleable to downstream pipe segment, a metering inlet path 25 being in flow communication with the fluid inlet, a metering outlet path being in flow communication with the fluid outlet; the metering inlet path is in flow communication with the metering outlet path through a flow unit articulable between the metering inlet path and the metering outlet path; a pressure responsive sealing diaphragm disposed for selective sealing an inlet port of the metering inlet path; an inlet chamber disposed at a 30 face of the sealing diaphragm being in flow communication with the inlet; a control chamber disposed at an opposite face of the diaphragm; a control fluid duct extending between the inlet and the control chamber, said control fluid duct is configured with pressure regulator; a discharge duct extending between the control chamber and the metering inlet path, said discharge duct is configured with a flow shut-off mechanism.

A fluid governing system according to the disclosure can typically comprise an integrated, solid unit housing designated with the inlet/outlet ports with respective coupling arrangements, metering inlet/outlet paths, as well as the respective coupling for the flow unit and, coupling arrangement for the flow shut-off mechanism and control chamber cover articulation arrangement and the respective ducts. According to a particular design the housing is molded, e.g. of plastic material.

Any one or more of the following designs, features and configurations can be incorporated in any aspect of the present disclosed subject matter, independently or in any combinations thereof:

- According to one particular configuration the flow unit is a fluid flow meter;
- The pressure regulator reduces pressure by a flow resistance element, e.g. a labyrinth. Pressure decrease benefits in that the control fluid duct extending between the inlet and the control chamber does not necessarily have to be of fine dimensions (liable to clog by particles in the fluid);
- According to one particular example, the pressure regulator reduces pressure corresponding to a flow path through a path having a diameter of 0.9 mm;
- All fluid flowing through the system is metered and monitored. Particularly, any fluid flowing through the control chamber flows back into the metering inlet path, whereby substantially all fluid flowing through the system is metered and monitored;
- A UFR (Unmeasured Flow Reducer) can be configured with the system, said UFR can be fitted before or after the metering unit;

The UFR (Unmeasured How Reducer) can be integral with the system;

The UFR (Unmeasured How Reducer) can serve also as a non-return valve;

The flow unit is a fluid metering unit;

The flow unit can be detachably attachable or integrated with the system;

The flow unit is detachably attachable articulated between the metering inlet path and the metering outlet path by a coupling port configured with coaxial inlet and outlet sealing ports.

The fluid flow unit is a FAM (Flexible Axis Meter) fluid metering unit;

The metering inlet path and the metering outlet path can be coaxial with one another;

A fluid filter for treating fluid directed into the control chamber can be disposed in the control fluid duct;

The control fluid duct is in flow communication with the fluid filter, whereby filtered fluid reaches the pressure regulator and the control chamber;

The fluid filter can be a finger-type filter. According to a particular configuration the fluid filer extends into the fluid inlet facilitating fluid flow through a filtering media and along a core of the filter, in direction from the fluid inlet into the control chamber;

The fluid filter can be accessible for maintenance and replacement through an opening within the control chamber;

The fluid governing system can be configured with one or more ports for receiving different sensors, such as a fluid temperature sensor, chemical/biologic analysis sensor, transparency sensor, pressure sensor, etc. The sensors can be disposed at any location, e.g. at the flow inlet. Flow outlet, control chamber, etc.;

The fluid governing system is T-like shaped, wherein the fluid inlet and the fluid outlet are coextensive, and the metering inlet path intersects the flow axis extending between the fluid inlet and the fluid outlet. According to one particular example the metering inlet path intersects the flow axis at a right angle;

The control chamber extends coextensively with the metering inlet path, wherein axial projection of a cover of the control chamber does not exceed 2 times a nominal diameter of the inlet port.

An override is provided for selectively overriding the position of the flow shut-off mechanism of the discharge duct. According to one particular example the flow shut-off mechanism is a solenoid;

The override mechanism can be a mechanical lever configured to displace a sealing plunger of the solenoid into its open position so as to enable fluid flow through the discharge duct;

According to a particular configuration the fluid flow pressure regulator is a labyrinth unit comprising at least one maze unit snugly disposed within a confined flow duct, said maze unit being configured with a patterned flow path forcing the fluid to undulate about a plurality of serpentines, thereby resulting in pressure decrease;

The maze unit can be configured with one or more flow direction diverters;

The maze unit can be configured with one or more flow collision paths;

The maze unit can be configured with a fluid inlet port extending into a flow path, said flow path extending about a tubular core element and comprising at least two of the following elements:

at least a serpentine/undulating portion;

at least one barrier member configured for splitting the flow stream and diverting it in two opposing directions; and at least one collision path wherein two opposite flow currents flow towards one another and collide with one another.

The control chamber is configured with a removable cover. Said removable cover facilitating access to the control chamber, to the control fluid duct, to the pressure regulator, to the discharge duct, pressure regulator and to the filter unit.

A central portion of the diaphragm can be configured with a reinforcing structure, preventing buckling/collapsing of the diaphragm;

The reinforcing structure of the diaphragm can be configured for fitting within the inlet port of the metering inlet path;

The arrangement is such that when the discharge duct is closed by the flow shut-off mechanism, the pressure within the control chamber ($P_{CC}$) is equal to the upstream pressure ($P_{US}$) at the fluid inlet [$P_{CC}=P_{US}$]. Furthermore, at this position, the pressure at the metering inlet path ($P_{MI}$) is smaller than the downstream pressure and the pressure within the control chamber [$P_{MI}<P_{DS}<P_{CC}$]. When the discharge duct is open, the pressure at the metering inlet path is similar to the downstream pressure [$P_{MI} \approx P_{DS}$];

The pressure differential over the pressure regulator is greater than the pressure differential over an inlet of the discharge duct;

The diaphragm is normally biased into closed position, i.e. wherein it sealingly engages the inlet port of the metering inlet path. Biasing of the diaphragm into its normally closed position is facilitated spontaneously owing to resilience of the diaphragm;

A biasing member, such as a coiled spring, cab be introduced for increasing biasing effect of the diaphragm also at substantially low flow rates;

The solenoid can be a latch solenoid configured for retaining its last position;

The fluid governing system is used in conjunction with a flow monitoring system, associated with a decision making system (either articulated with the system or remote), configured for closing/opening the flow shut-off mechanism depending upon flow parameters.

In use, the arrangement is such: when the flow shut-off mechanism is open a downstream consumer can consume fluid. At this position the pressure at the metering inlet path ($P_{MI}$) drops, resulting in corresponding pressure decrease at the fluid inlet ($P_{US}$), owing to a flow path open therebetween at this position. As long as fluid is consumed, the diaphragm will continue to open/deform until its fully open position.

Whenever the shut-off mechanism is manipulated into its closed position, the discharge duct is sealed and fluid flow therethrough terminates, whereby the pressure at the control chamber exceeds the pressure at the opposite face of the membrane, namely the pressure at the metering inlet path and at the inlet chamber, resulting in displacement of the sealing diaphragm into its normally sealed position. Manipulation of the shut-off mechanism into its closed position is either automatic and responsive to a control signal, or facilitated by the override mechanism.

A condition for the sealing diaphragm to deform and displace into its open position is that $(P_{DS}-P_{CC})*A_{effective}>F_{elasticity}$;

wherein:

$A_{effective}$ denotes the effective surface area of the sealing diaphragm, namely the area of the diaphragm exposed to inlet chamber;

$F_{elasticity}$ denotes the force of elasticity of the sealing diaphragm.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 6A is a rear-top perspective view of the flow metering and control system, with the manual override lever disposed into a manually closed position.

DETAILED DESCRIPTION OF EMBODIMENTS

Figure 1A:
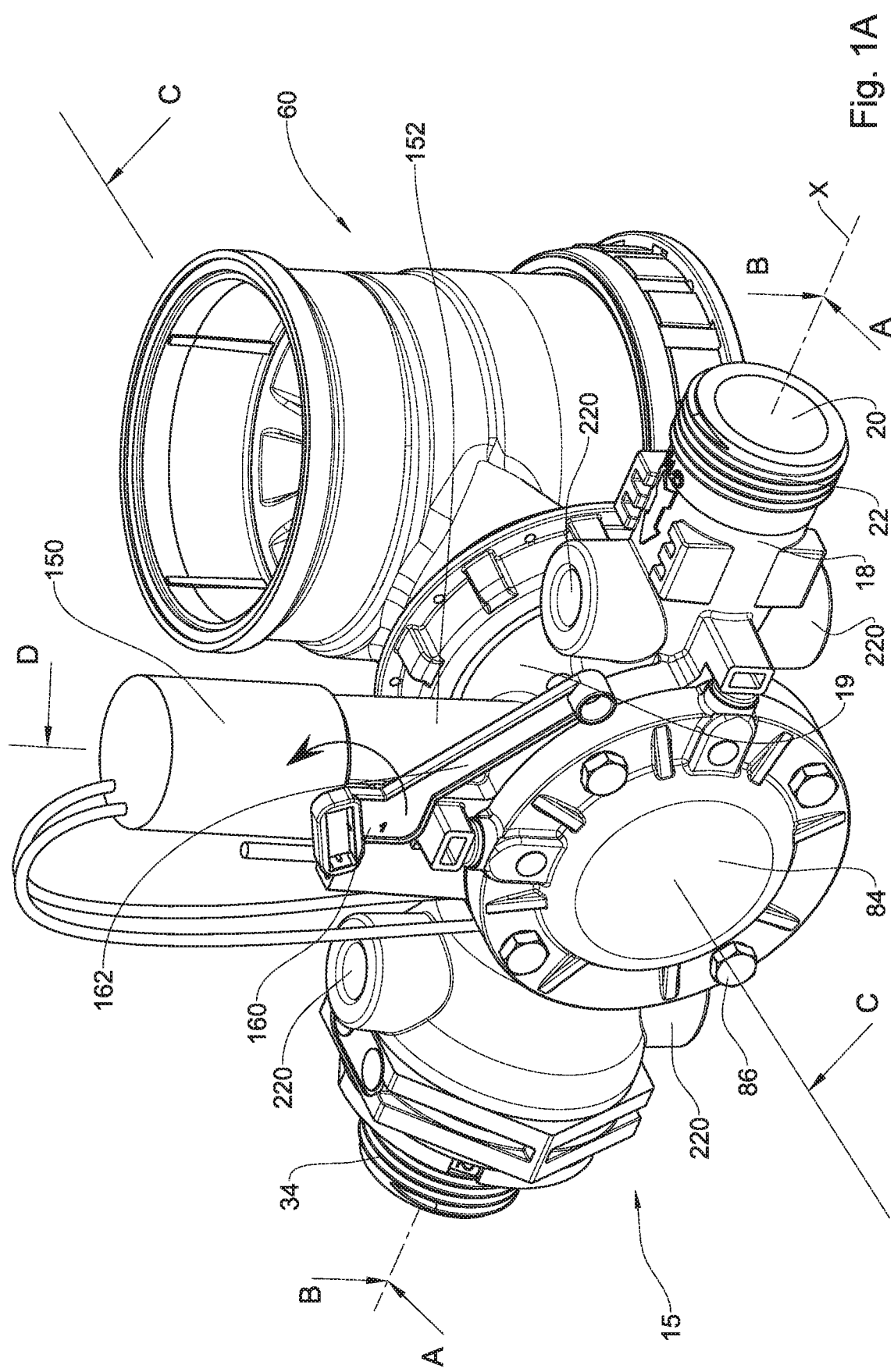
FIG. 1A is a rear-top perspective view of a flow metering and control system according to the present disclosure.
Figure 1B:
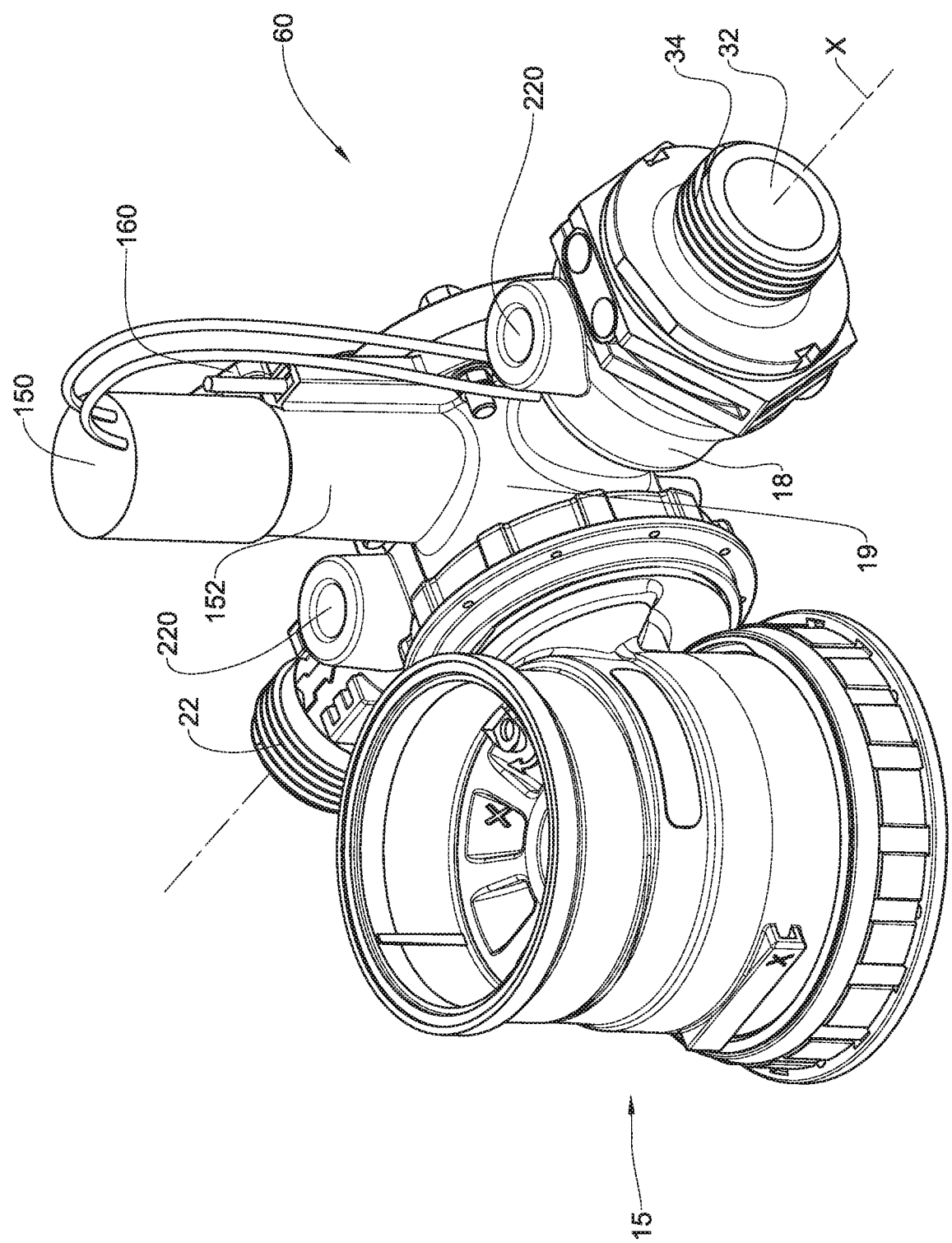
FIG. 1B is front-top perspective view of the flow metering and control system of FIG. 1A.
Figure 1C:
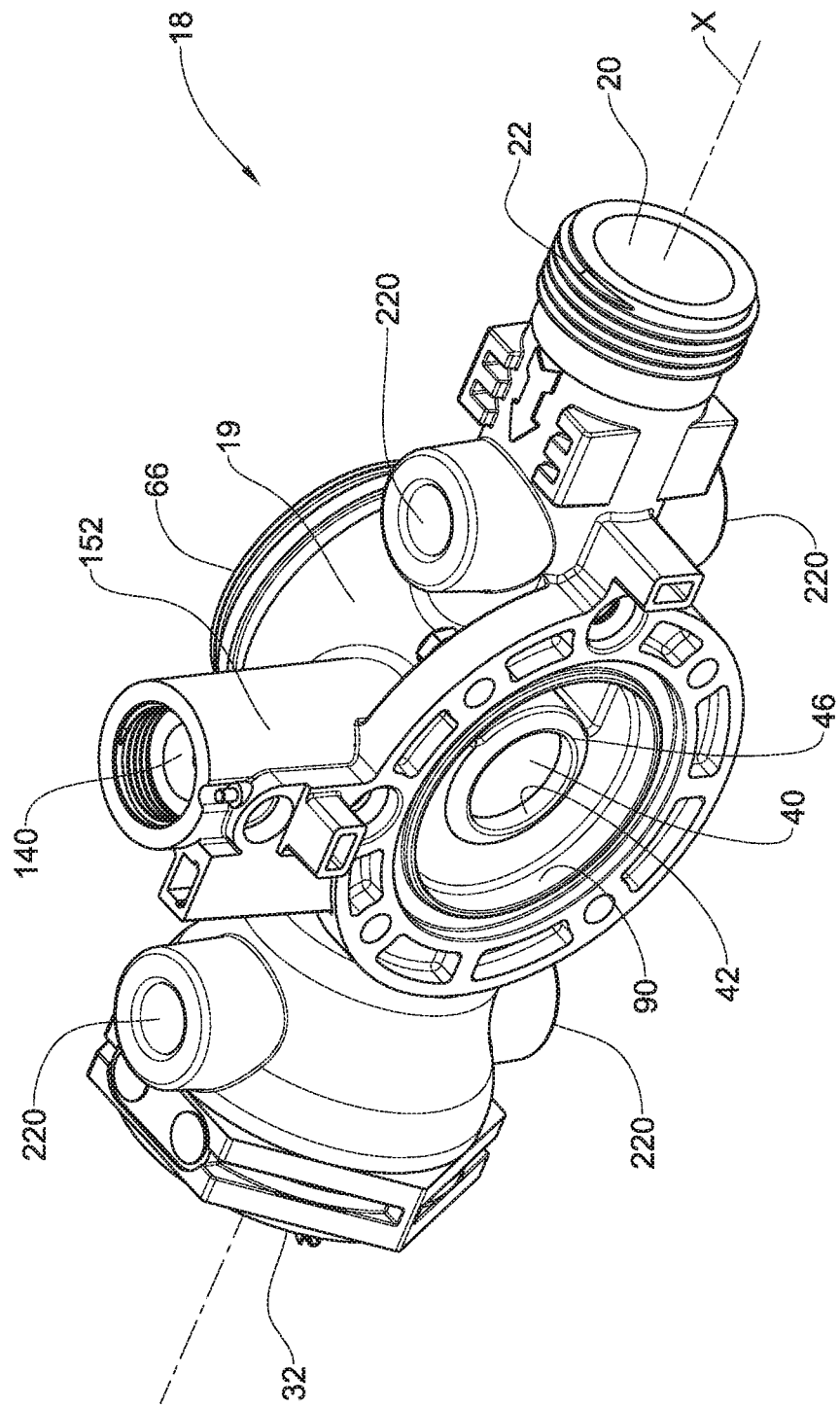
FIG. 1C is rear-top perspective view of a housing of the flow metering and control system of FIG. 1A.
Figure 1D:
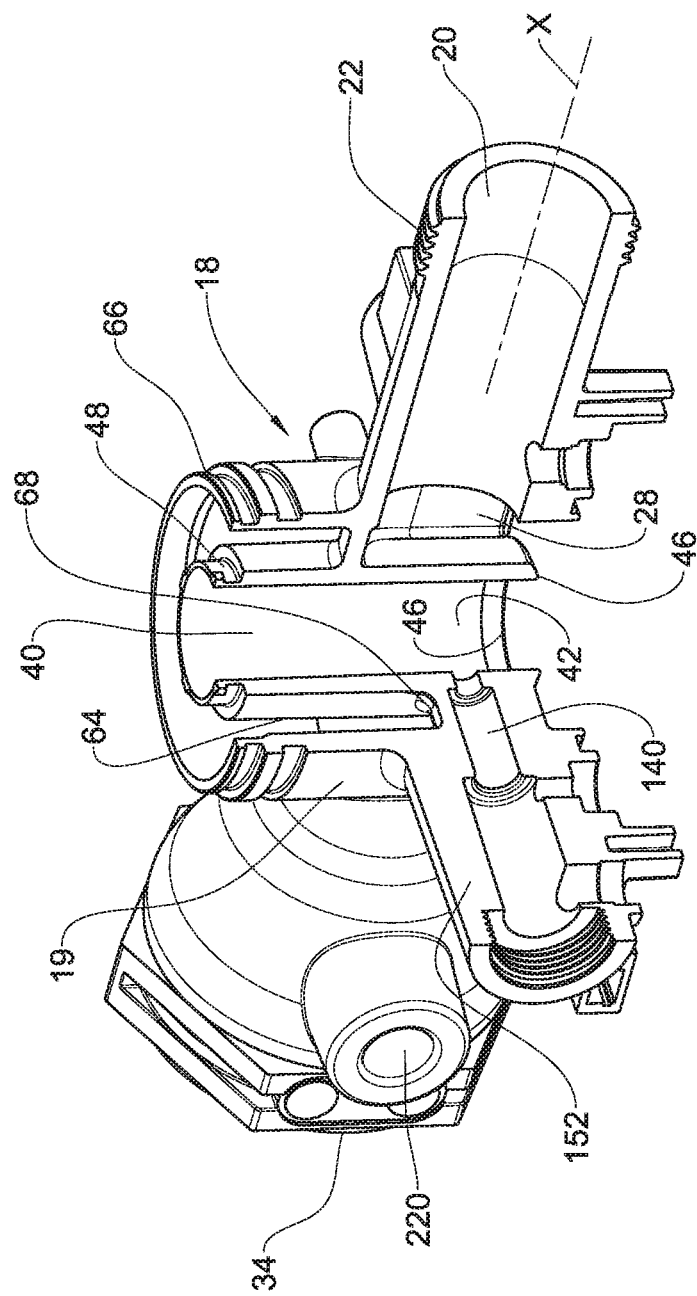
FIG. 1D is a sectioned view of the housing, taken at a right angle along section lines D-A in FIG. 1A.

Attention is first directed to FIGS. 1 to 4 of the drawings illustrating a fluid flow governing system according to an example of the present disclosure, generally designated 15. The flow governing system 15 comprises a single unit housing 18 (seen isolated from other components in FIG. 1C) made for example of plastic (or other) molded material.

The housing is configured with an inlet port 20 fitted with an external threaded coupling 22 for articulation to an upstream pipe segment (not shown), i.e. a fluid supply line. The inlet is in flow communication with a fluid inlet 24 extending between the inlet port 20 and an inlet chamber 28.

Coaxially extending, at an opposite side of the housing 18, there is configured a fluid outlet 30 extending towards an outlet port 32 fitted with an external threaded coupling 34 for articulation to a downstream pipe segment (not shown).

The inlet side of the housing and the outlet side of the housing define a longitudinal flow axis designated X.

The housing 18 has a central hub-like portion 19 configured with a metering inlet path 40 extending between an inlet port thereof 42 (in turn configured with a sealing rim 46) and an outlet port 48 configured for articulation thereof, in a seal-tight fashion, to a flow unit generally designated 60, as will be discussed hereinafter in greater detail. In the attached drawings the flow meter 60 is illustrated for sake of exemplifying its articulation to the housing, whereby its metering components are not of significance and are not shown.

Coaxially surrounding the metering inlet path 40 there is a metering outlet path 64 configured with an inlet port 66 for articulation, in a seal-tight fashion, to an outlet of the flow unit generally designated 60, as will be discussed hereinafter in greater detail. The metering outlet path 64 has an outlet port 68 (FIGS. 2A and 2B) extending into the fluid outlet 30 of the housing 18.

The hub-like portion 19 has at a front side thereof, below the sealing rim 46 of the metering inlet path 40, a substantially coaxially disposed chamber accommodating a sealing diaphragm 72. The sealing diaphragm 72 is made of a resilient material and has a T-shaped edge 74 configured for sealingly clamping between an annular diaphragm seating portion 78 of the housing 18, and a corresponding annular diaphragm seating portion 80 of a sealing cover 84 (best seen in FIG. 2C). Cover 84 is secured to the housing 18 by a plurality of fastening bolts 86, clamping therebetween the T-shaped edge 74 of the sealing diaphragm 72.

According to a particular configuration of the flow governing system 15, the inlet port 20 has an inner diameter D (FIG. 3C) and the axial projection 85 (FIG. 6A) of the cover 84 of the control chamber, the axial projection 85 (FIG. 6A) having a length d, that does not exceed about 2 times the nominal diameter D of the inlet port. In a particular example D equals about 22.9 mm. and the distance d is 34.4 mm.

The sealing diaphragm 72 divides the chamber into the inlet chamber 28 (disposed at a face of the sealing diaphragm 72 being in flow communication with the fluid inlet 24), and a control chamber 90, disposed at an opposite face of the sealing diaphragm 72, said control chamber 90 enclosed by the cover 84.

Figure 2A:
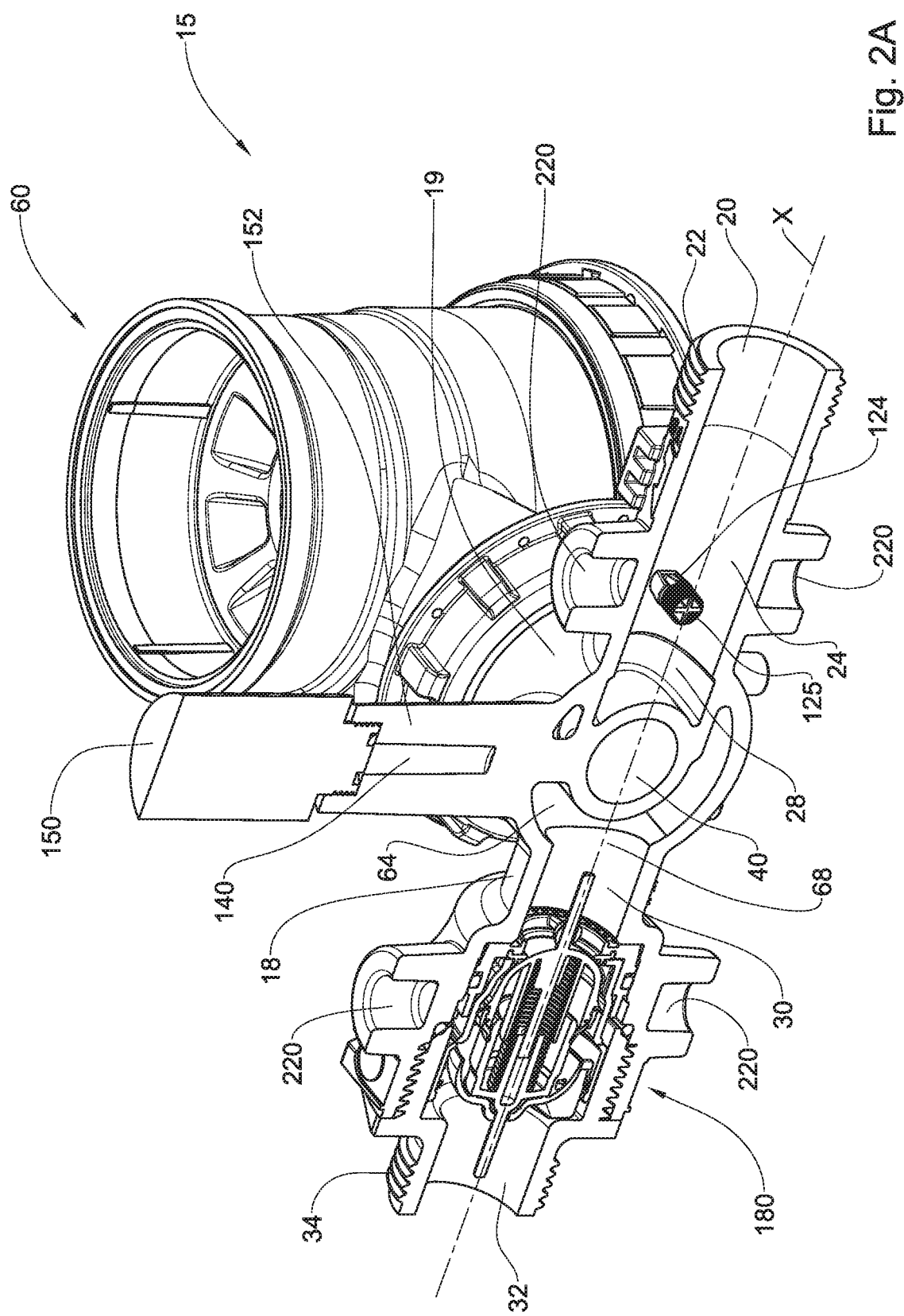
FIG. 2A is a vertical sectioned along longitudinal flow axis X in direction of arrows A-A in FIG. 1A.
Figure 2B:
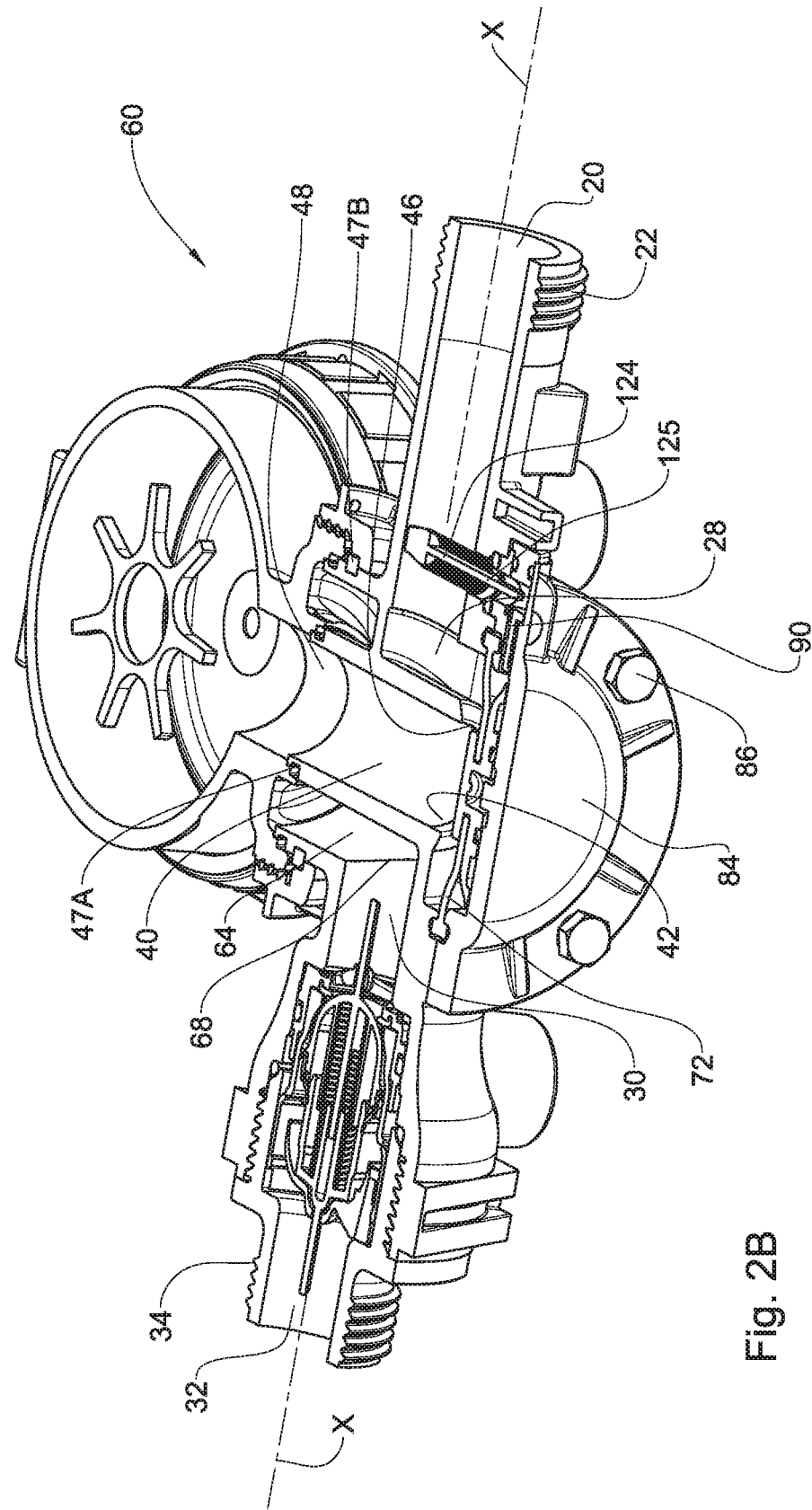
FIG. 2B is a horizontal sectioned view along longitudinal flow axis X in direction of arrows B-B in FIG. 1A.
Figure 2C:
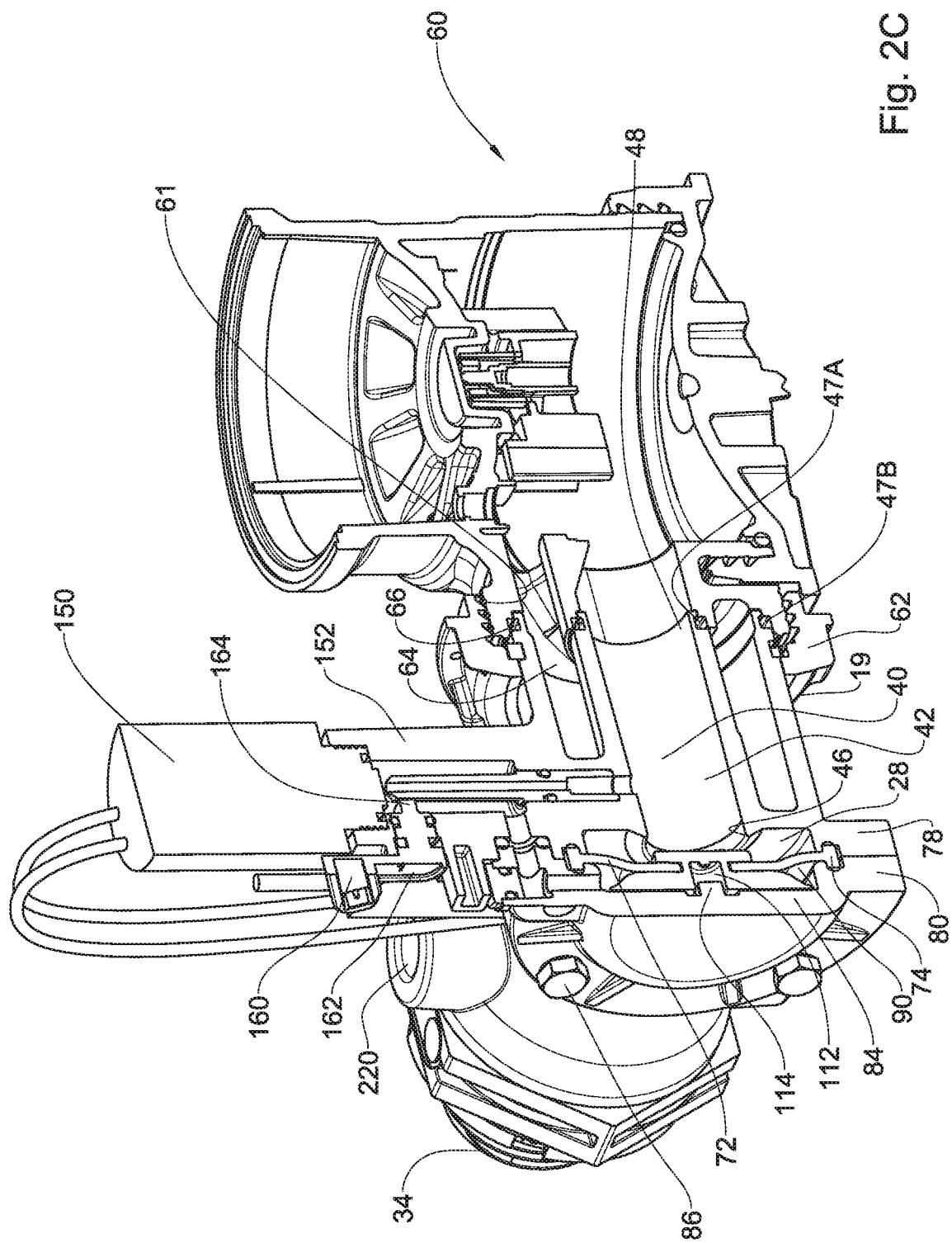
FIG. 2C is a vertical sectioned view taken in direction of arrows C-C, the system being in its open position.
Figure 3A:
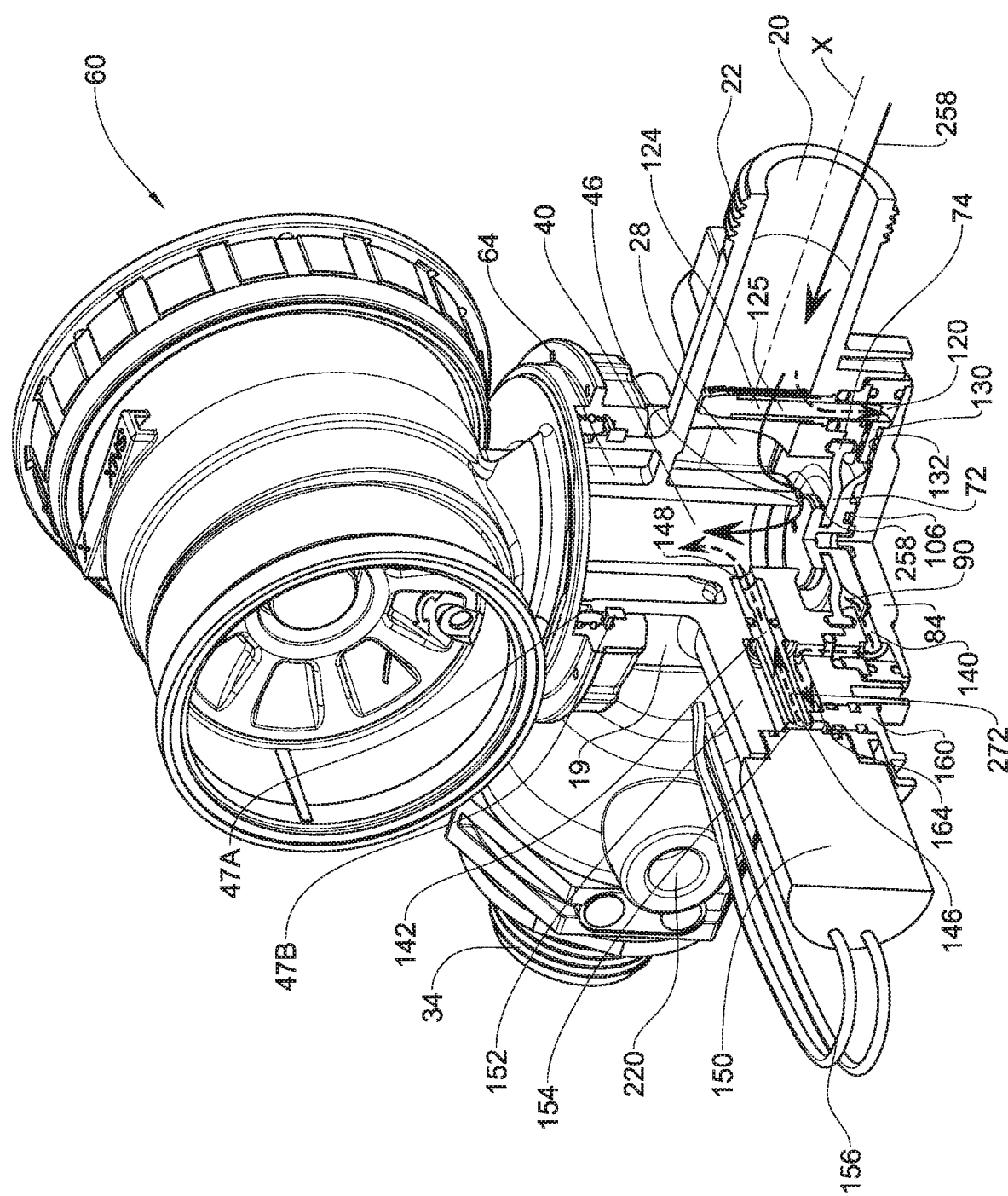
FIG. 3A is a sectioned view taken at a right angle along section lines D-A in FIG. 1A, the system at its open position.
Figure 3B:
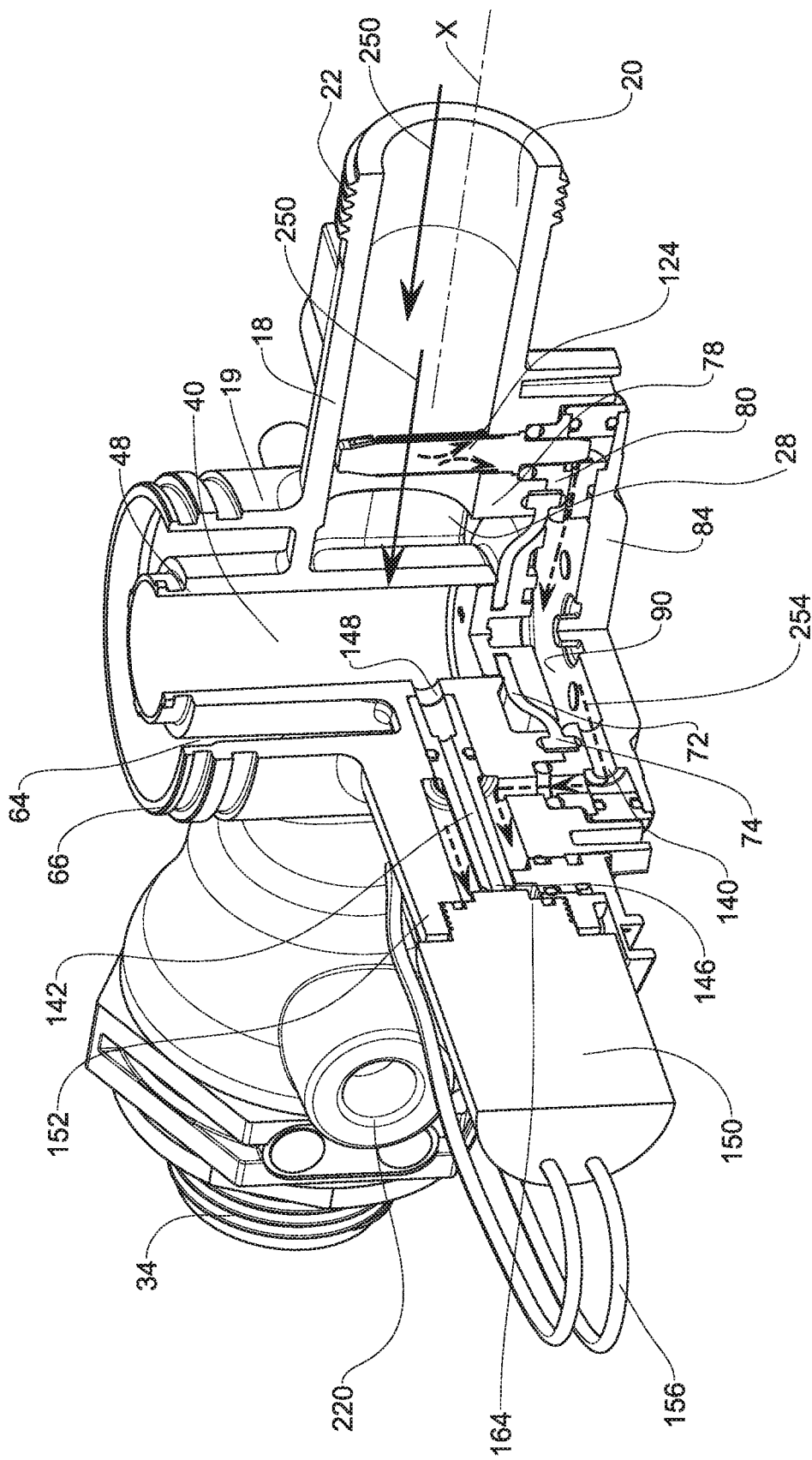
FIG. 3B is the same as FIG. 3A, however with the metering unit removed for sake of clarity.
Figure 3C:
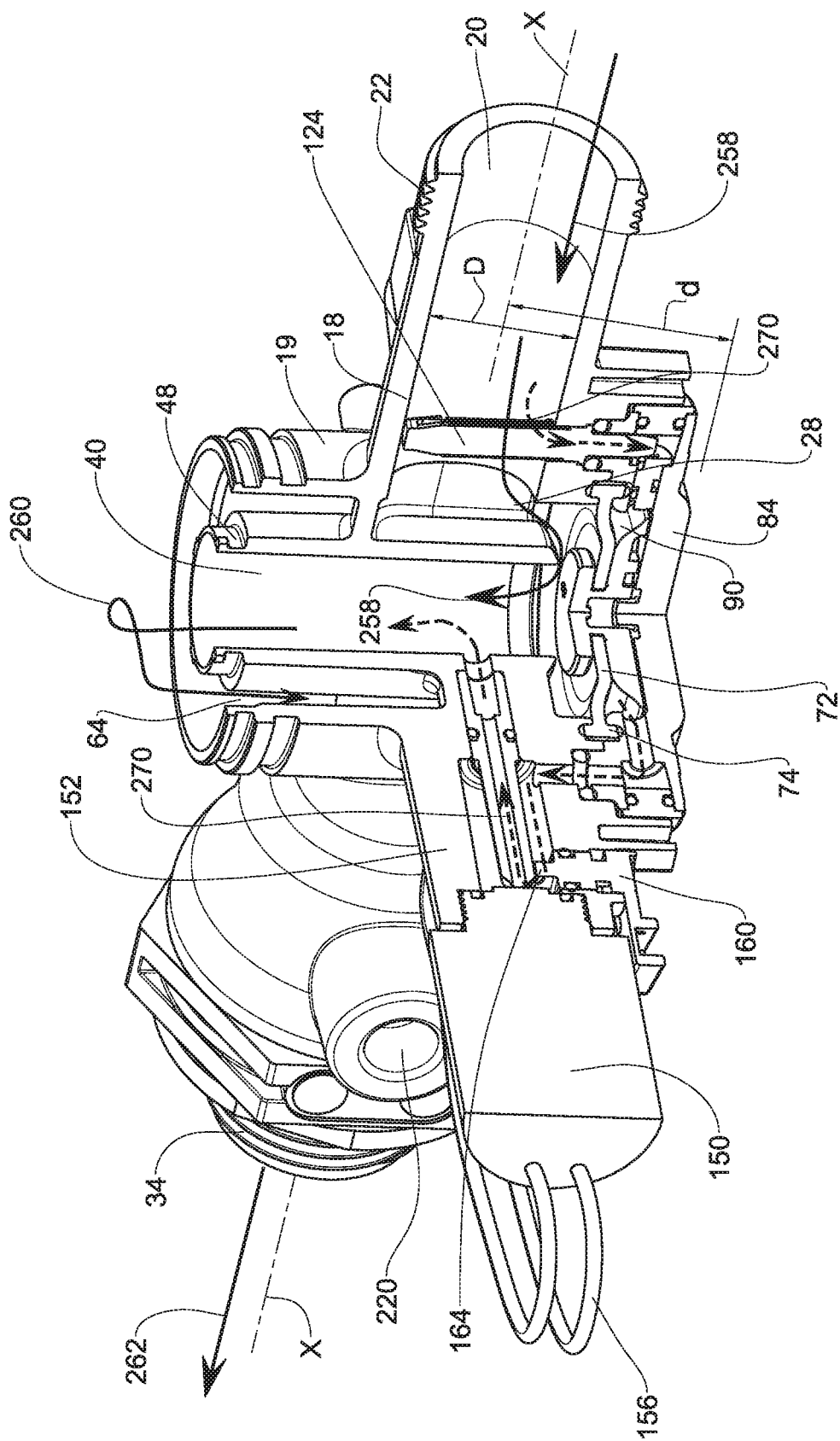
FIG. 3C is a sectioned view taken at a right angle along section lines D-A in FIG. 1A, the system at its closed position.
Figure 5:
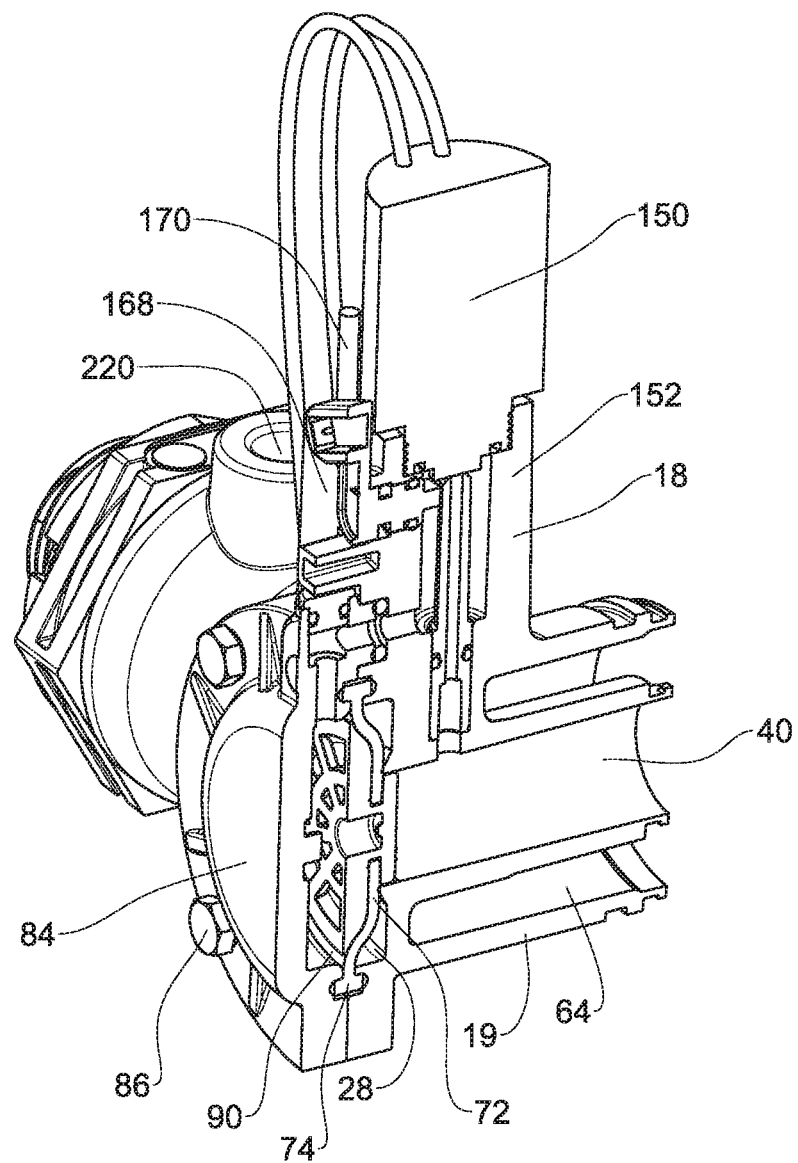
FIG. 5 is a vertical sectioned view taken in direction of arrows C-C in FIG. 1A, without the FAM meter, the system being in its closed position.
Figure 6B:
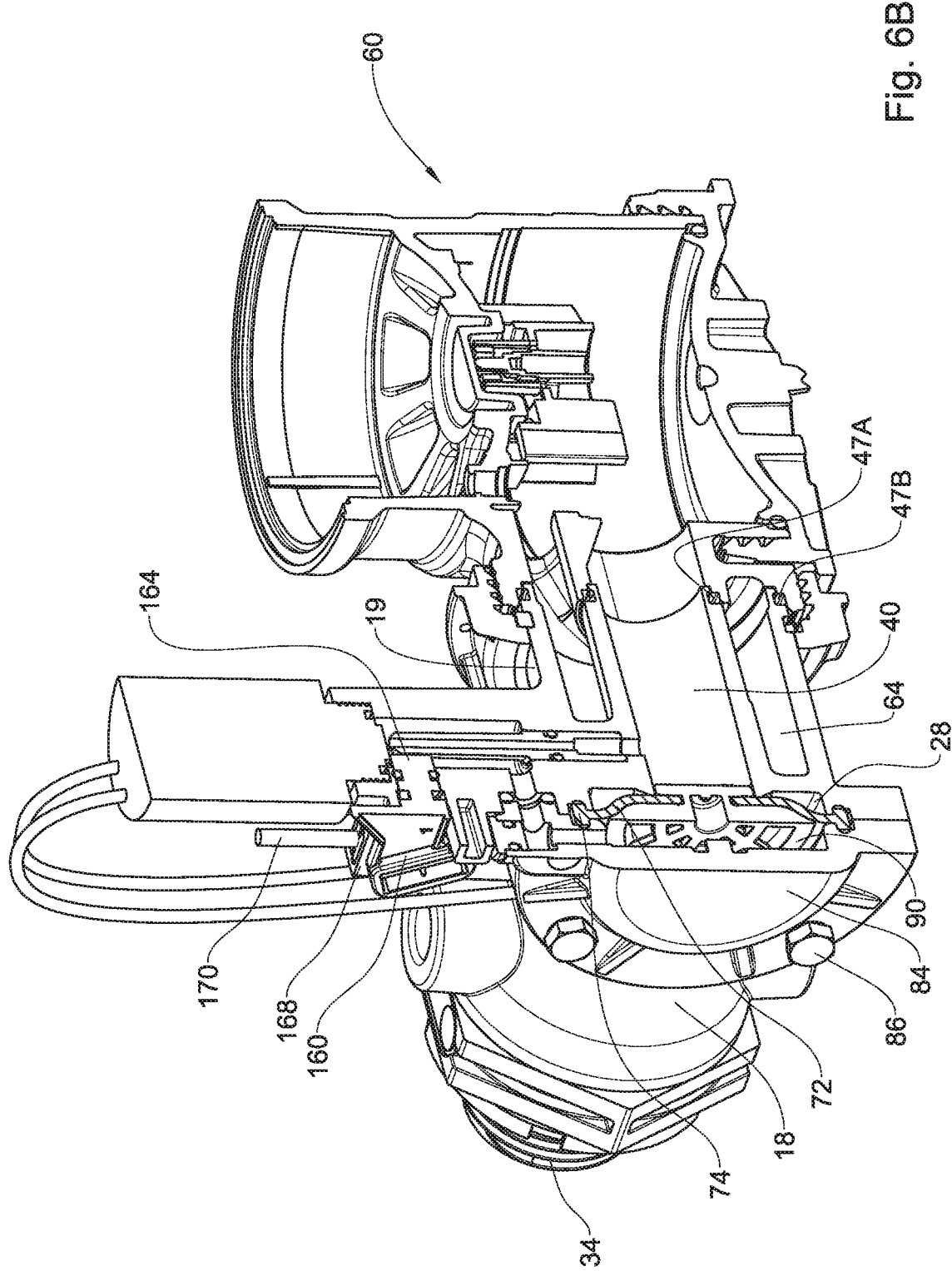
FIG. 6B is a vertical sectioned view taken in direction of arrows H-H in FIG. 6A, the system in its manually closed position.

Owing to its geometrical shape and configuration, the sealing diaphragm 72 is normally biased into sealing engagement with the sealing rim 46 of the metering inlet path 40 (FIGS. 3B, 5 and 6B). However, owing to resiliency of the diaphragm, under certain pressure differential conditions as will be discussed hereinafter, it is displaceable into an open position at which it disengages from the sealing rim 46 (FIGS. 2B, 2C and 3C).

The sealing diaphragm 72 has a central portion rigidified by a solid plate member 94 extending through a center of the diaphragm and sealingly clamping it, with a sealing face plate 96 and a base face plate 98. Sealing face plate 96 is sized for accommodation within the inlet port 42 of the metering inlet path 40, thereby imparting the sealing diaphragm 72 with true position axial guidance/displacement into its sealed/closed position, namely so as to ensure its sealing position about the sealing rim 46 (e.g. seen in FIG. 3B).

The base face plate 98 is configured displacement against the cover 84 (e.g. FIG. 2C). According to one particular example the base face plate 98 is configured with a biasing coiled spring support, e.g. in the form of an annular recess 106 (FIG. 3A), said coiled spring (not shown) bearing at one end against the base face plate 98 and at an opposite end against the cover 84. The biasing member, when provided, contributes in force aimed in direction facilitating displacement of the sealing diaphragm 72 into its sealed/closed position. The provision of a biasing member (e.g. a spring) is in particular useful to ensure tight sealing of the diaphragm 72 against the sealing rim 42 in case of low flow rates, and further to overcome poor surface quality and dirt residing at the sealing vicinity.

In addition, as can be seen for example in FIG. 2C, the base face plate 98 is configured with a central depression 112 and the cover 84 is configured with a corresponding projection 114, whereby the diaphragm 72 is guided along its displacement into its open position, so as to ensure substantial axial displacement thereof.

The system is further configured with a control fluid duct 120 extending from, and being in flow communication with the inlet chamber 28 and the control chamber 90. A finger-type filter 124 is fitted into the inlet chamber 28 such that only filtered fluid flows through the filter into the control fluid duct. The finger-type filter 124 is disposed centrally within fluid inlet 24 facilitating fluid flow through a filtering media and along a ribbed core 125 of the filter 124, in into the control chamber.

A pressure regulator 130 is snugly disposed within a flow duct 132, whereby fluid flowing from the inlet chamber 28, through the filter 124, then flows into am maze of the pressure regulator 130, the structure and operation of which will be discussed hereinafter in further detail with reference to FIGS. 4A and 4B. Thus, fluid entering the control chamber 90 is filtered and pressure-regulated.

A discharge duct 140 extends from the control chamber 90 and is in flow communication with the metering inlet path 40 through a duct portion 142, configured in turn with an inlet nozzle 146 and an outlet port 148 extending at the metering inlet path 40. A latch-type solenoid 150 (i.e. a solenoid configured to maintain a set position without the constant application of an electrical current) is screw coupled to a cylindrical boss 152, said solenoid 150 is configured such that a sealing plunder 154 extends opposite the nozzle 146 of duct portion 142. An electric signal to the solenoid 150, through electric wires 156 causes the sealing plunger 154 to displace between an open position (FIGS. 2C, 3A, and 3C) and a closed/sealing position (FIGS. 3B, 5, and 6B). At the open position the flow path between the discharge duct 140 and the duct portion 142 is open and wherein fluid can flow from the control chamber 90 to the metering inlet path 40.

A manual override mechanism 160 is provided, said override is configured with an external lever 162 and an actuator 164 extending opposite the sealing plunger 154 of the solenoid 150. The arrangement is such that manipulating the lever 162 results in displacing the sealing plunger 154 into the open position of the solenoid, regardless of its position set by electric current. The nozzle 146 will thus remain unsealed as long as the override mechanism 160 is manipulated into its open position (FIG. 6B). In order to provide indication regarding the position of the manual override mechanism 160, a magnetic sensor 168 is provided, whereby displacing the lever 162 into the open position results in generating in indicative signal by electric wires 170.

In the particular example the flow governing system 15 is integrally fitted at an inline configuration, with a UFR (Unmeasured flow Reducer) generally designated 180, fitted at the outlet section of the system, namely between the fluid outlet 30 and the outlet port 32. It is however appreciated that the UFR 180 can be integral with, or detachably articulated to the system, either before or after the flow governing system 15. It is also noted that the UFR 180 serves also as a non-return valve, to thereby prevent backflow through the system.

The UFR 180 is used in conjunction with the fluid metering system wherein the flow unit, namely flow meter 60, has a minimum measuring flow threshold. The UFR valve is shiftable between an open position at flow rates above its minimum measurable flow threshold, and a pressure pulsating position depending on pressure differential over the inlet port and the outlet port, said pressure pulsating position altering between a closed position essentially prohibiting fluid flow therethrough at flow rates below the minimum measuring flow threshold, and an open position admitting fluid flow at a measurable flow rate above the minimum measuring flow threshold of the meter 60.

The UFR 180, in the particular illustrated example, is of the type disclosed in WO2004025229. However it is appreciated that other UFR configuration are possible. It is appreciated that whilst the provision of a UFR device is not mandatory, it is beneficial for a system of the disclosed type, for obtaining best metering results.

Reverting now to the flow unit 60, there is illustrated in the present example, a FAM-type fluid flow meter, for example of the kind disclosed in U.S. Pat. No. 6,178,816. Such a meter is suitable for mounting at various orientations, e.g. horizontal pipe configuration, vertical pipe configuration and inclined configurations.

The flow unit 60 is fitted with threaded portion 61 configured for articulation to the housing hub-like portion of the housing 18 by a screw coupler ring 62, wherein an inlet port of the flow unit 60 is sealingly articulated to the outlet port 48 metering inlet path 40, and an outlet of the flow unit 60 is sealingly articulated to the inlet port 66 of the metering outlet path 64. The outlet port 48 and the inlet port 66 are each fitted with an annular groove accommodating a sealing ring 47A and 47B. The arrangement being such that all fluid entering through the metering inlet path 40 enters the flow unit 60 for recordation/metering thereof, and flows out into the metering outlet path 64 and through the outlet port 68 into the outlet port 32.

Figure 4A:
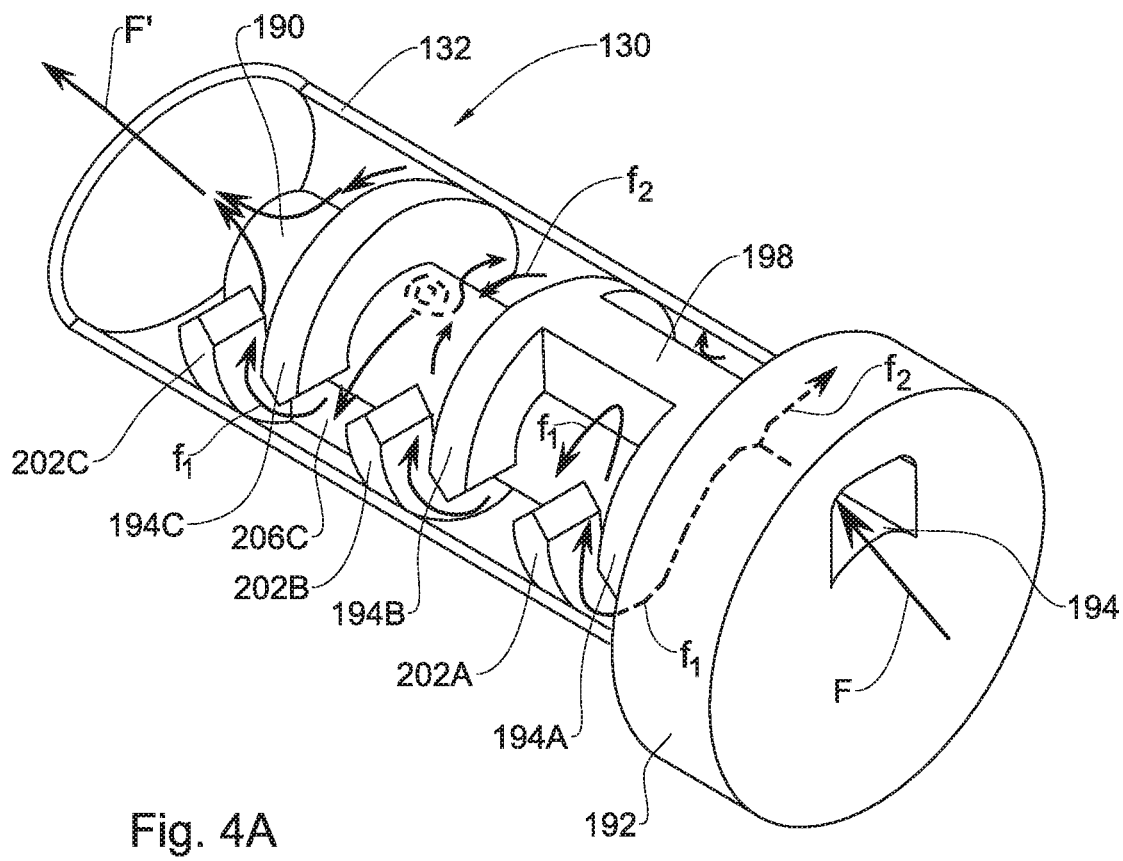
FIG. 4A is a perspective view of a flow regulator element used in the flow metering and control system according to the present disclosure.
Figure 4B:
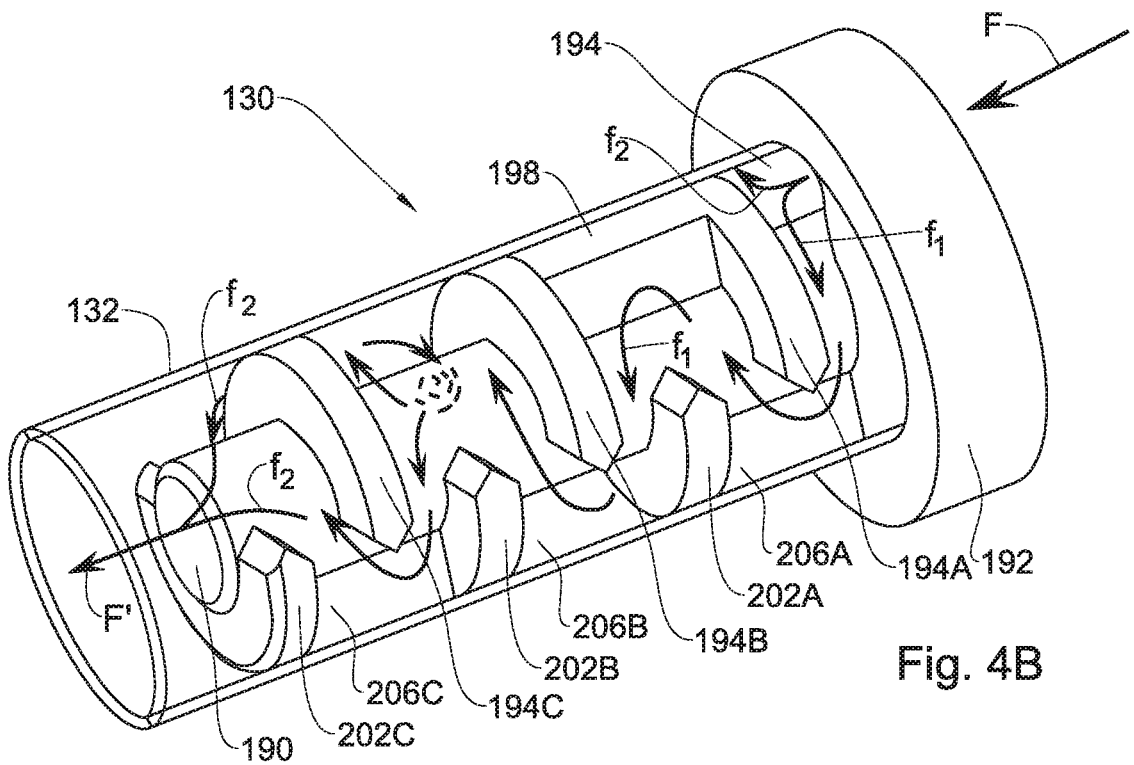
FIG. 4B is another perspective view of a flow regulator element used in the flow metering and control system according to the present disclosure.

Turning now to FIGS. 4A and 4B of the drawings, the pressure regulator 130 is illustrated in detail, isolated from the other components of the system. For sake of clarity and to exemplify structure and operation of the pressure regulator 130, a portion of flow duct 132 is schematically superimposed thereover. It is appreciated that the pressure regulator 130 is in the form of a plug-like member, snugly received within the duct 132, such that a flow path is defined between a core portion 190 of the pressure regulator 130 and the inside wall surface of the flow duct 132, as explained hereinafter.

The plug is configured with a rear wall 192 having an inlet port 194 extending into an upstream side of the control fluid duct 120 (however after the filter 124). A plurality of semicircular ribs 194A, 194B and 194C radially extending from a top portion of the core 190 and are oriented downwards, with an axial rib 198 extending between the apex of the neighboring ribs 194A and 194B. Likewise, a plurality of semicircular ribs 202A, 202B and 202C are disposed, radially extending from a bottom portion of the core 190 and oriented upwards staggered between of the downwardly facing ribs 194A, 194B and 194C and with some extent of radial overlap between the edges of the downwardly facing ribs 194A, 194B and 194C and the upwards facing ribs 202A, 202B and 202C. A segmented axial rib 206A, 206B and 206C extends between the wall 192 and the apex of the neighboring ribs 206A, 206B and 206C, respectively. Also noted, the edges of each of the ribs 202A, 202B, 202C, 206A, 206B and 206C are chamfered so as to create a smooth fluid flow path, as explained below.

A flow pattern through the pressure regulator 130 is illustrated in FIGS. 4A and 4B and is represented by arrowed lines. As fluid flow F enters the flow regulator 130 through the inlet 194 it encounters the downstream face of rib 194A and is forced to split into two sub flows $f_1$ and $f_2$ and flow in opposite directions over between the core 190 and the inside wall surface of the flow duct 132. Then, each of the split currents $f_1$ and $f_2$ undulates between the neighboring radial ribs 194A and 202A until it encounters a respective face of the axial rib 198, diverting the sub currents $f_1$ and $f_2$ downwards, and again, at an undulating pattern the sub currents $f_1$ and $f_2$ are directed upwards, between the radial ribs 194B and 194C, whereupon the two sub currents $f_1$ and $f_2$ collide with one another and then flow downwards over the core 190 into the space between the neighboring ribs 202B and 194C, and then, upon a further encountering with axial rib 206C the split currents $f_1$ and $f_2$ encounter the final radial rib 202C, whereupon the split currents $f_1$ and $f_2$ unit and a low F' emerges from the pressure regulator 130, however after losing much of its pressure.

According to one particular example the pressure regulator 130 simulates a pressure drop corresponding with a flow path through a 0.9 mm nozzle.

It is appreciated that losing energy/pressure is a result of the flow taking place between the undulating radially disposed ribs, the encountering of the current against the axially extending ribs, splitting of the flow current into two sub flow currents and the vortex caused upon collision of the sub flow currents. Depending on the required pressure drop over the pressure regulator, a plug with different geometric setup can be introduced.

The housing 18 is further configured with a plurality of coupling bosses 220 (four in the exemplified case). Each of the bosses 220 is configured for coupling thereto, typically by screw fastening, a sensor (not shown), for example a fluid temperature sensor, chemical/biologic analysis sensor, transparency sensor, pressure sensor and the like. As can be seen in the drawings, the bosses 220 are positioned such that a sensor introduced therein extends into, or on close proximity, with locations at the inlet and outlet ports of the system 15.

Once coupled, the sensors can be configured for transmitting respective signals to a controller, remote or in-site, whereupon a respective close/open signal can be generated to the solenoid 150. For example, one of the sensors can be a chemical sensor configured to sense the concentration of fluoride often used for water fluoridation for preventing tooth decay, in domestic water systems. If the concentration of fluoride departs from a prescribed range (drops below or exceeds), a this will be sensed by a sensor and a sensor signal will be generated to the controller, which in turn can generate an alarm signal and/or shutoff flow through the signal will be issued by the fluid governing system 15 by setting the solenoid 150 to its closed position, as will be explained herein below.

The housing 18 is so configured that removal of the cover 84 is easily carried out by opening the bolts 86. Removing the cover exposes the control chamber 90 and facilitates access to the diaphragm 72, the pressure regulator 130 and the filter 124, for easy maintenance and replacement thereof. Likewise, once the cover 84 is removed, at least segments of the control fluid duct 132 and the discharge duct 140 are exposed and are accessible for servicing.

In use, the inlet port 22 of the fluid governing system 15 is coupled to a an upstream supply line (not shown) by threaded coupler 22, and respectively the outlet port 32 us coupled to a downstream line (not shown) by threaded coupler 34.

At the normal state of the system, the diaphragm 72 is disposed at its closed position (FIGS. 3B, 5 and 6B), whereupon the fluid entering the inlet chamber 28 (designated by arrowed line 250) can not continue into the metering inlet 40, i.e. fluid does not flow further to the outlet port 32. However, some fluid can flow through the control fluid duct 120 (namely through filter 124 and through the pressure regulator 130) into the control chamber 90 (extending below the sealing diaphragm 72). The restricted amount of fluid flowing into the control chamber is referred to as 'control fluid' (illustrated in FIGS. 3B, 5 and 6B by dashed lines designated 254), said fluid further occupying those portions the discharge duct 140 extending up to the inlet nozzle 146 of duct portion 142, that since the solenoid 150 is at its so called closed position, i.e. the sealing plunger 154 sealingly engages the inlet nozzle 146.

At the closed position (FIGS. 3B, 5 and 6B), when the discharge duct 140 is sealed by the flow shut-off mechanism, namely solenoid 150, the pressure within the control chamber 90 ($P_{CC}$) is equal to the upstream pressure ($P_{US}$) at the fluid inlet 28 [$P_{CC}=P_{US}$]. Furthermore, at this position, the pressure at the metering inlet path 40 ($P_{MI}$) is smaller than the upstream pressure ($P_{US}$) and the pressure within the control chamber ($P_{CC}$), i.e. [$P_{MI}<P_{US}<P_{CC}$].

When the discharge duct 140 is open (i.e. when the solenoid 150 displaces into its open position as in FIGS. 2C, 3A and 3C) the pressure at the metering inlet path 40 is similar to the upstream pressure [$P_{MI} \approx P_{US}$].

In use, the arrangement is such: when the flow shut-off mechanism (solenoid 150) is open (FIGS. 2C, 3A and 3C), a downstream consumer can consume fluid. At this position the pressure ($P_{MI}$) at the metering inlet path 40 drops (owing to consumption at the outlet end), resulting in corresponding pressure ($P_{DS}$) decrease at the fluid inlet 28 owing to a flow path open therebetween at this position (arrowed line 258 in FIGS. 3A and 3C). Fluid flowing from the metering inlet path 40 into the flow meter 60 is marked by arrowed line 260 and then flows into the metering outlet path 64 and out through the outlet port 32, now identified by arrowed line 262. As long as fluid is consumed at the downstream, the diaphragm will continue to open/deform until its fully open position, that owing to pressure differential over the diaphragm, namely, pressure at the control chamber face is lower than pressure at the other face of the diaphragm. Any fluid flowing thorough the control chamber 90 then flows through the discharge duct 140, and through the duct portion 142 into the pressure metering inlet path 40, whereby even a relatively small amount of control fluid is metered. The control fluid flow path is represented by dashed arrows 272.

A condition for the sealing diaphragm to deform and displace into its open position is that $(P_{DS}-P_{CC})*A_{effective}>F_{elasticity}$;

wherein:

$A_{effective}$ denotes the effective surface area of the sealing diaphragm, namely the area of the diaphragm exposed to inlet chamber;

$F_{elasticity}$ denotes the force of elasticity of the sealing diaphragm.

whenever consumption at the downstream end is terminated, pressure at the metering inlet path 40 will drop, resulting in displacing of the diaphragm 72 into its normally sealed position.

Whenever the shut-off mechanism 150 (FIGS. 6A and 6B) is manipulated into its closed position (e.g. manually by lever 162 of the override 160), the inlet nozzle 146 of the discharge duct 140 is sealed and fluid flow therethrough terminates, whereby the pressure at the control chamber 90 exceeds the pressure at the opposite face of the membrane 72, namely the pressure at the metering inlet path 40 and at the inlet chamber 28, resulting in displacement of the sealing diaphragm 72 into its normally sealed position. Manipulation of the shut-off mechanism into its closed position is either automatic and responsive to a control signal, or facilitated by the override mechanism.

The invention claimed is:

1. A fluid governing system, comprising:
    a fluid inlet comprising an fluid inlet port configured to couple to an upstream pipe segment;
    a fluid outlet comprising a fluid outlet port configured to couple to a downstream pipe segment;
    a flow unit;
    a metering inlet path being in flow communication with the fluid inlet;
    a metering outlet path being in flow communication with the fluid outlet, the metering inlet path is in flow communication with the metering outlet path through the flow unit, the flow unit being articulable between the metering inlet path and the metering outlet path;
    a pressure responsive sealing diaphragm disposed for selective sealing a metering inlet port of the metering inlet path;
    an inlet chamber disposed at a face of the sealing diaphragm, the inlet chamber being in flow communication with the fluid inlet;
    a control chamber disposed at an opposite face of the sealing diaphragm; and
    a control fluid duct extending between the inlet chamber and the control chamber, said control fluid duct comprises
        a pressure regulator, and
        a discharge duct extending between the control chamber and the metering inlet path, said discharge duct comprising a flow shut-off mechanism switchable between a closed position and an open position; and
        an override mechanism for mechanically forcing the flow shut-off mechanism to switch from the closed position to the open position, and preventing the flow shut-off mechanism from returning to the closed position.

2. The fluid governing system according to claim 1, wherein fluid flowing through the control chamber flows back into the metering inlet path, whereby all fluid flowing through the system is metered and monitored.

3. The fluid governing system according to claim 1, wherein the flow unit is detachably attachable and articulated between the metering inlet path and the metering outlet path by a coupling port comprising an inlet sealing port and an outlet sealing port, wherein the inlet sealing port and the outlet sealing port are coaxial.

4. The fluid governing system according to claim 1, further comprising a coupling port configured between the metering inlet path and the metering outlet path, for detachably attaching the flow unit thereto.

5. The fluid governing system according to claim 4, wherein the coupling port comprises a sealing inlet port and a sealing outlet port, coaxially disposed.

6. The fluid governing system according to claim 1, wherein the sealing diaphragm is normally biased into closed position and is configured for sealingly engaging the metering inlet port of the metering inlet path.

7. The fluid governing system according to claim 1, further comprising a fluid filtering unit disposed in the control fluid duct for treating fluid directed into the control chamber.

8. The fluid governing system according to claim 1, wherein one or more ports are configured for receiving one or more sensors indicative of one or more parameters of the fluid flowing through the system.

9. The fluid governing system according to claim 1, wherein the fluid inlet and the fluid outlet are coextensive, and the metering inlet path intersects a flow axis extending between the fluid inlet and the fluid outlet.

10. The fluid governing system according to claim 1, wherein the metering inlet path and the metering outlet path are coaxial with one another.

11. The fluid governing system according to claim 1, further comprising an unmeasured flow reducer (UFR) mechanism configured with the system.

12. The fluid governing system according to claim 7, wherein the control chamber comprises a removable cover, removal of which renders accessibility to the fluid filtering unit and to the pressure regulator.

* * * * *